United States Patent
Meier et al.

(10) Patent No.: US 11,403,511 B2
(45) Date of Patent: Aug. 2, 2022

(54) UNSUPERVISED ANNOTATION USING DUAL NETWORK SYSTEM WITH PRE-DEFINED STRUCTURE

(71) Applicant: Apple Inc., Cupertino, CA (US)

(72) Inventors: Peter Meier, Los Gatos, CA (US); Tanmay Batra, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 650 days.

(21) Appl. No.: 16/515,397

(22) Filed: Jul. 18, 2019

(65) Prior Publication Data

US 2020/0065653 A1 Feb. 27, 2020

Related U.S. Application Data

(60) Provisional application No. 62/721,693, filed on Aug. 23, 2018.

(51) Int. Cl.
| | | |
|---|---|---|
| *G06N 3/04* | (2006.01) | |
| *G06N 3/08* | (2006.01) | |
| *G06K 9/62* | (2022.01) | |
| *G06T 7/70* | (2017.01) | |
| *G06T 7/10* | (2017.01) | |
| *G06T 7/20* | (2017.01) | |

(52) U.S. Cl.
CPC ......... *G06N 3/0454* (2013.01); *G06K 9/6267* (2013.01); *G06N 3/08* (2013.01); *G06T 7/10* (2017.01); *G06T 7/20* (2013.01); *G06T 7/70* (2017.01); *G06T 2207/20081* (2013.01); *G06T 2207/20084* (2013.01); *G06T 2207/20132* (2013.01)

(58) Field of Classification Search
CPC ........ G06N 3/0454; G06N 3/08; G06N 3/084; G06N 3/088; G06K 9/6267; G06K 9/6262; G06K 9/627; G06T 7/10; G06T 7/20; G06T 7/70; G06T 2207/20081; G06T 2207/20084; G06T 2207/20132; G06V 10/82; G06V 40/103
USPC ....................................................... 382/158
See application file for complete search history.

(56) References Cited

U.S. PATENT DOCUMENTS

| | | |
|---|---|---|
| 2017/0011279 A1 | 1/2017 | Soldevila et al. |
| 2017/0371017 A1 | 12/2017 | Odry et al. |

(Continued)

FOREIGN PATENT DOCUMENTS

WO  WO-2019155064 A1 *  8/2019 ............. G06N 20/20

*Primary Examiner* — Amandeep Saini
(74) *Attorney, Agent, or Firm* — Thompson Hine LLP

(57) ABSTRACT

In some implementations at an electronic device, training a dual EDNN includes defining a data structure of attributes corresponding to defined parts of a task, processing a first instance of an input using a first EDNN to produce a first output while encoding a first set of the attributes in a first latent space, and processing a second instance of the input using a second EDNN to produce a second output while encoding attribute differences from attribute averages in a second latent space. The device then determines a second set of the attributes based on the attribute differences and the attribute averages. The device then adjusts parameters of the first and second EDNNs based on comparing the first instance of the input to the first output, the second instance of the input to the second output, and the first set of attributes to the second set of attributes.

20 Claims, 6 Drawing Sheets

(56) References Cited

U.S. PATENT DOCUMENTS

2018/0174160 A1 6/2018 Gupta et al.
2018/0247201 A1* 8/2018 Liu ..................... G06N 3/0454

* cited by examiner

UNSUPERVISED ANNOTATION USING DUAL NETWORK SYSTEM WITH PRE-DEFINED STRUCTURE

CROSS-REFERENCE TO RELATED APPLICATION

This Application claims the benefit of U.S. Provisional Application Ser. No. 62/721,693 filed Aug. 23, 2018, which is incorporated herein in its entirety.

TECHNICAL FIELD

The present disclosure generally relates to the training and use of neural networks, and in particular, to systems, methods, and devices for the unsupervised training and use of encoder-decoder neural networks (EDNNs).

BACKGROUND

Neural networks can be trained for various operations including, but not limited to, prediction, forecasting, classification, pattern recognition, or the like. An encoder-decoder neural network is a type of neural network that learns to encode data from an input into a short code in a latent space, and then decode that code into something that closely matches the original data. Encoder-decoder neural networks can be trained to encode significant attributes of the input, for example, identifying features of an input image or sound using the latent space. However, encoder-decoder neural networks trained without supervision often lack sufficient accuracy.

SUMMARY

Various implementations disclosed herein include devices, systems, and methods that use encoder-decoder neural networks for annotation including without limitation: data, audio, video, image and other input annotation. Some implementations provide unsupervised annotation training using a dual network system that uses a pre-defined data structure for the latent space. Such implementations can be performed by an electronic device having one or more processors. The training can include defining or otherwise obtaining a predefined set of values for attributes corresponding to a task. For example, a wrist-to-elbow distance attribute by be defined for a human pose estimation task. The device processes a first instance of an input using a first encoder-decoder neural network to produce a first output while encoding a first set of values in a first latent space. For example, the first network can process an input image and produce an output image to match the input image, while encoding data intended to correspond to the actual distance from wrist to elbow. The device also processes a second instance of the input using a second encoder-decoder neural network to produce a second output while encoding a second set of values in a second latent space. For example, the second network can process another instance of the input image and produce an output image to match the input image, while encoding data intended to correspond to a difference between the actual distance from wrist to elbow and the average distance from wrist to elbow.

The device then compares the data from both of the encoder-decoder neural networks in the training process. To make the data comparable, the device converts the data from the second encoder-decoder neural network. The device creates a third set of values based on differences between the predefined set of values for the attributes and the second set of values. Continuing the above example, the device may use the difference data from the second network to reconstruct a corresponding wrist to elbow distance, e.g., by adding the differences to the wrist to elbow average values. The comparison of the data from the encoder-decoder neural networks is then used as part of the training process as explained in the following paragraph.

To train the duel network of the first and second encoder-decoder neural networks the device adjusts parameters, e.g., node weights, of the first and second encoder-decoder neural networks based on several comparisons. A first comparison compares the first instance of the input to the first output to ensure the first encoder-decoder neural network's output matches its input. Similarly, a second comparison compares the second instance of the input to the second output to ensure the first encoder-decoder neural network's output matches its input. Finally, a third comparison compares the first set of values to the third set of values to effectively ensure that the values for the attributes encoded by the first encoder-decoder neural network correspond to the values for the attributes encoded by the second encoder-decoder neural. In other words, the first network learns to compute attribute values directly, the second network learns to calculate differences of attribute values from averages, and this comparison encourages consistency between the two encoding. By learning these different types of encodings for the attributes, the dual network can be trained to provide relatively accurate results with little or no supervision. Once trained, one or both of the encoder-decoder neural networks can be deployed, e.g., integrated into an application for use by end users to perform the intended task.

Additional neural networks can be used in the training process. Such neural network can perform transformations that facilitate the use of values associated with different reference frames, e.g., wrist-to-elbow distances relative to a 3D space associated an input image and average wrist-to-elbow distances relative to a 3D space associated with predefined data set. For example, in some implementations, a third neural network is used to transform the second set of values into a 3D space associated with the predetermined values to facilitate creation of the third set of values (e.g., to facilitate adding differences to averages) and a fourth neural network is used to transform the third set of values into a 3D space associated with the first set of values to facilitate the comparison between the first and third sets of values.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
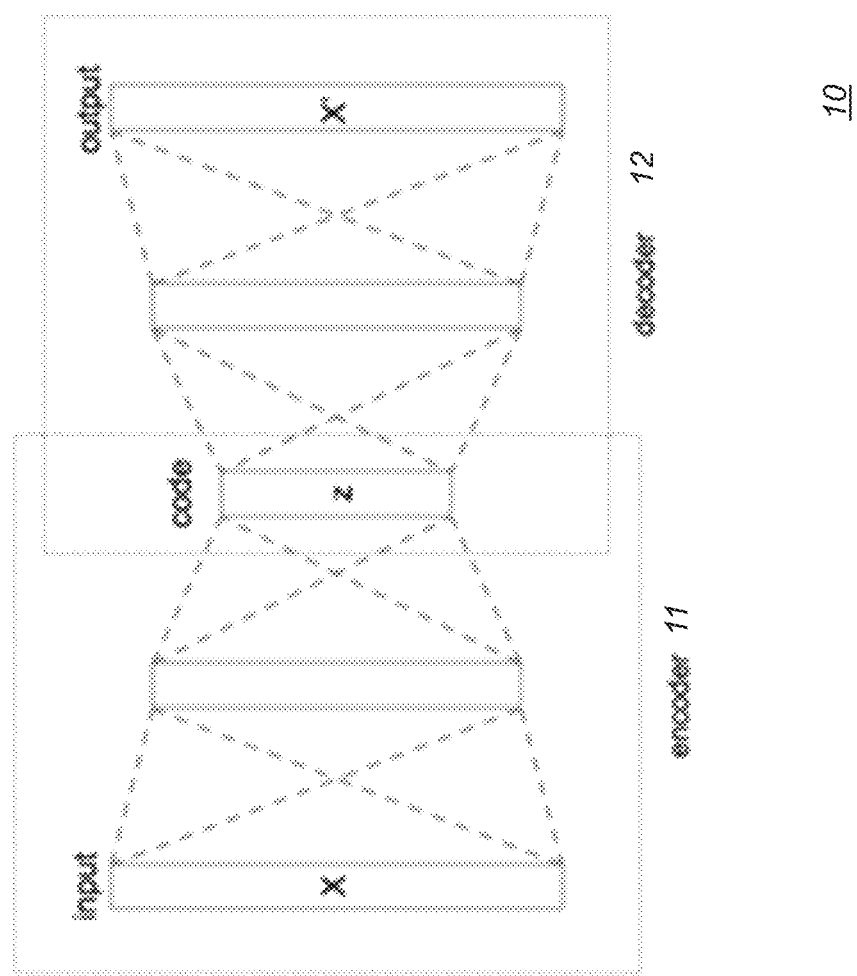
FIG. 1 is a block diagram of an related art encoder-decoder neural network environment.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Architecturally, one of the simplest forms of an encoder-decoder neural network is a feedforward, non-recurrent neural network having an input layer, an output layer equal in size (e.g., nodes) to the input layer, and one or more hidden layers connecting them, and with the purpose of reconstructing its own inputs (e.g., instead of predicting the target value Y given inputs X).

FIG. 1 is a block diagram of an encoder-encoder neural network environment. An encoder-decoder 10 has two parts, an encoder stage 11 and a decoder stage 12, which can be defined as transitions ϕ and ψ such that:

$$\phi: \mathcal{X} \to \mathcal{F}$$
$$\psi: \mathcal{F} \to \mathcal{X}$$
$$\phi, \psi = \underset{\phi, \psi}{\operatorname{argmin}} \|X - (\psi \circ \phi)X\|^2$$

In the simplest case, where there is one hidden layer, the encoder stage 11 of the encoder-decoder 10 takes the input $x \in \mathbb{R}^d = \mathcal{X}$ and maps it to $z \in \mathbb{R}^p = \mathcal{F}$ as shown in equation (1):

$$z = \sigma(Wx+b) \quad (1)$$

The encoded z is usually referred to as code, latent variables, latent space, or latent representation. Here, σ is an element-wise activation function such as a sigmoid function or a rectified linear unit. W is a weight matrix, and b is a bias vector. After that, the decoder stage 12 of the encoder-decoder 10 maps z to the reconstruction x' of the same shape as x as shown in equation (2):

$$x' = \sigma'(W'z+b') \quad (2)$$

where σ', W', and b' for the decoder stage 12 may differ in general from the corresponding σ, W, and b for the encoder stage 11, depending on the design of the encoder-decoder 10.

Encoder-decoders can also be trained to minimize reconstruction errors (e.g., squared errors) as shown in equation (3):

$$\mathcal{L}(x,x') = \|x-x'\|^2 = \|x - \sigma'(W'(\sigma(Wx+b))+b')\|^2 \quad (3)$$

where x is usually averaged over some input training set. If the feature space $\mathcal{F}$ has lower dimensionality than the input space $\mathcal{X}$, then the feature vector ϕ(x) can be regarded as a compressed representation of the input x. Additional types of encoder-decoders include but are not limited to denoising encoder-decoders, sparse encoder-decoders, variational encoder-decoders and contractive encoder-decoders.

An exemplary training algorithm for an encoder-decoder can be summarized as:

For each input x, (a) do a feed-forward pass to compute activations at all hidden layers, then the output layer to obtain an output x';

(b) measure the deviation of x' from the input x (e.g., using squared error); and (c) backpropagate the error through the encoder-decoder neural networks and perform weight updates.

An encoder-decoder is often trained using one of the many variants of backpropagation (e.g., conjugate gradient method, steepest descent, etc.). However, related art encoder-decoders still result in a very slow learning process or poor solutions (for example, see https://en.wikipedia.org/wiki/Encoder-decoder).

Figure 2:
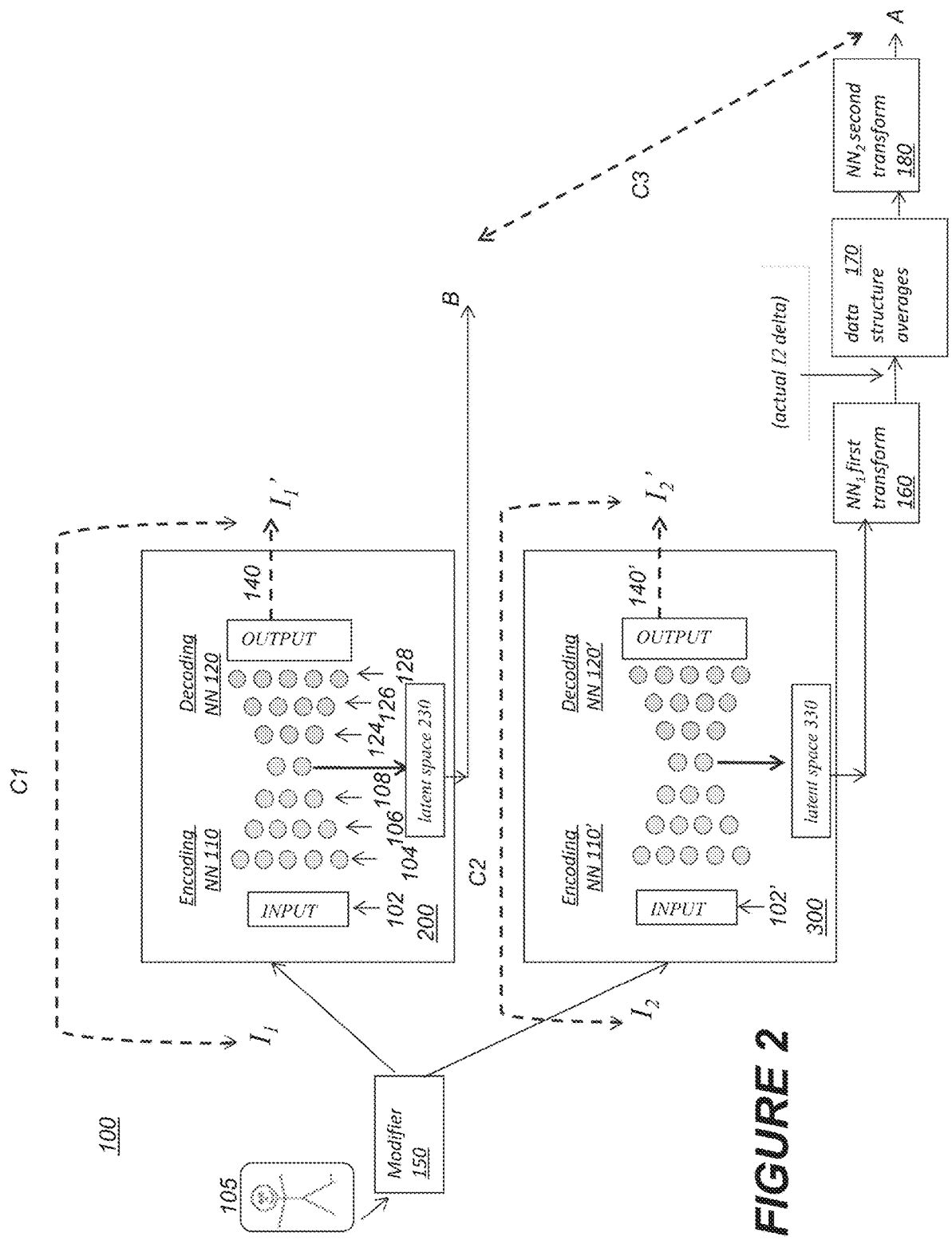
FIG. 2 is a block diagram of an example dual encoder-decoder neural network environment in accordance with some implementations.

FIG. 2 is a block diagram of an example dual EDNN environment in accordance with some implementations. As shown in FIG. 2, EDNN 200 operates in parallel with EDNN 300 in an example EDNN environment 100.

In various implementations, unsupervised training (e.g., no training data such as labeled images) is used for the EDNN environment 100. After training, only the trained encoder NN 110 of the EDNN 200 is used in for annotation of inputs for a corresponding application (e.g., pose annotation).

To improve training accuracy, in various implementations, a defined data structure is used for a latent space for both the EDNN 200 and the EDNN 300. The data structure defines attributes (e.g., wrist-to-elbow distance) corresponding to defined parts (e.g., right arm) of a task (e.g., human pose annotation). During training, related instances (e.g., overlapping crops) of each single training input are respectively provided to the EDNN 200 and the EDNN 300. The EDNN 200 has a latent space encoded with attributes for an actual object implementation in the input. The EDNN 300 has a latent space encoded with differences from attribute averages for the actual object in the input. In various implementations, three (3) losses are reduced or minimized (e.g., by backpropagation) for each training input. The three losses include (i) the related input provided to EDNN 200 compared to a generated output of the EDNN 200, (ii) the related input provided to EDNN 300 compared to a generated output of the EDNN 300, and (iii) a transformed structure output (e.g., reconstructed actual attribute or reconstructed pose) from the latent space of EDNN 300 compared to the latent space of EDNN 200 (e.g., actual attribute or actual pose). The three losses are illustrated in FIG. 2 by arrows C1, C2, and C3.

EDNNs 200, 300 respectively include an encoding NN 110, 110' and a decoding NN 120, 120'. In various implementations, the input or input data is numerical or converted to numerical data. The encoding NN 110 includes an input layer 104, one or more hidden (or inner) layers 106, and an output layer 108. The encoding NN 110' has a similar structure. Each layer comprises one or more nodes. A weight is a variable that sits on an edge between nodes or otherwise connects nodes. Weights can include weights between the input layer and a hidden layer, weights between more than one hidden layer, and weights between the last hidden layer and the output layer. The hidden layers 106 decrease in size (e.g., number of nodes) moving from the input layer 104 side in the direction of the output layer 108. In various implementations, an input 102, 102' is input to an input layer. In various implementations, the output layer (e.g., output layer 108) represents a latent space (230, 330) or an encoded representation of the input 102, 102' (e.g., $I_1$, $I_2$).

The decoding NN 120 includes an input layer 124, one or more hidden (or inner) layers 126, and an output layer 128. The decoding NN 120' has a similar structure. The hidden layers 106 increase in size (e.g., number of nodes) moving from the input layer 124 side in the direction of the output layer 128. In various implementations, the output 108 or latent space is input to the input layer 124. In some implementations, an output 140, 140' from the output layer 128 represents a decoded representation (e.g., $I_1'$, $I_2'$) of the latent space that is a similar or very nearly matching recreation of the input 102, 102' (e.g., $I_1$, $I_2$). Each EDNN 200, 300 attempts to reduce or minimize differences (e.g., through backpropagation of an error) between the output 140, 140' of the decoding NN 120, 120' and the input 102, 102' to the encoding NN 110, 110' during training.

As shown in FIG. 2, each EDNN 200, 300 receives separate modified versions of the input 105. In some implementations, a modifier 150 obtains the input 105 and generates two versions or instances of the input. As shown in FIG. 2, the modifier 150 receives an input I (e.g., image I) and outputs inputs $I_1$ to EDNN 200 and input $I_2$ to EDNN 300.

The EDNN 200 generates the output 140 to be similar or identical to the input $I_1$ while encoding latent space 230. The EDNN 300 will generate the output 140' to be similar or identical to the input $I_2$ while encoding latent space 330.

In various implementations, the EDNNs 200, 300 each use a defined data structure to implement latent space in accordance with annotations to be provided after training is complete for the environment 100 (e.g., encoding NN 120 of the EDNN 200). In various implementations, the data structure includes a predetermined number of attributes corresponding to defined parts of a task. In some implementations, the EDNN 200 is trained to learn attributes (e.g., in first latent space 230) of the task. The EDNN 300 is trained to learn differences from attribute averages (e.g., second latent space 330) of the task.

Thus, as shown in FIG. 2, the latent space 230 and the latent space 330 correspond to the data structure (e.g., equal in size, corresponding attributes), but are defined differently.

In some implementations, the data structure can implement annotations for inputs including but not limited to audio, images, video or a data set.

In some implementations, the environment 100 implements human pose estimation or annotation for an input image. In such implementations, the data structure can represent segments of a human skeleton pose. For example, the latent space 230 can represent attributes of such "segments" including size, length, color, volume, etc. For example, the latent space 230 can include a right foot length/size, a right shin length/size, right thigh length/size, a left foot length/size, a left shin length/size, a left thigh length/size, a right hand length/size, a right forearm length/size, a right upper arm length/size, a left hand length/size, a left forearm length/size, a left upper arm length/size, a torso length/size, and a head length/size.

In addition, each attribute (e.g., item) in the data structure can be represented by an average value for that attribute. In various implementations, the average values for human pose annotation can include an average right foot length/size, an average right shin length/size, right thigh length/size, an average left foot length/size, an average left shin length/size, an average left thigh length/size, an average right hand length/size, an average right forearm length/size, an average right upper arm length/size, an average left hand length/size, an average left forearm length/size, an average left upper arm length/size, an average torso length/size, and an average head length/size. As used herein, the term "attribute averages" is intended to include values "representative" of the average (e.g., mean, median, mode). In some implementations, example averages include compiling a collection and generating the average based on a mathematical determination (e.g., arithmetic mean).

In some implementations, the latent space 330 can represent differences from averages of each segment of a human skeleton pose. For example, the latent space 330 can represent differences (e.g., deltas) from attribute averages of such "segments" including size, length, color, volume, etc. In one implementation, the latent space 330 can represent differences from length averages for each segment of the pose. For example, when the length average of a forearm is 10 inches and an input image includes a forearm of length 11 inches, the latent space 330 value of a forearm attribute for that input image would be +1 (e.g., the difference from the attribute average value).

In various implementations, the data structure can implement human teeth annotation. In some implementations, the data structure can represent a size for each of 16 lower jaw teeth and 16 upper jaw teeth, a color for each of the 32 teeth, or a volume (e.g., height, width and length) for each of 32 teeth. For this example, the latent space 230 can represent attributes of such "teeth" including size, length, color, volume, etc. Further, the average values for human teeth annotation are known or can be mathematically determined from a population. Thus, "attribute averages" for teeth would be known and could include an average size for each of 16 lower jaw teeth and 16 upper jaw teeth. In some implementations, the latent space 330 can represent differences from averages of each size for each of 16 lower jaw teeth and 16 upper jaw teeth.

A phoneme is a sound or a group of different sounds perceived to have the same function by speakers of the language or dialect in question. Despite there being just 26 letters in the English language there are approximately 44 phonemes or unique sounds. The 44 sounds help distinguish one word or meaning from another. For example, the sounds represented by "c" and "b" are different phonemes, as in the words "cat" and "bat." In some implementations, the environment 100 can implement phoneme annotation (e.g., for a particular language) for an audio input. In some implementations, a data structure defined for the latent space 230 includes attributes or entries to represent each phoneme for an input phrase. For example, in some implementations, the latent space 230 includes entries to represent each actual phonemes for the input phrase. The average values for phoneme annotation can include an average sound representation (e.g., converted to a numerical entry) for each of the 44 phonemes. In some implementations, the latent space 330 can include entries to represent differences from average phonemes for each phoneme of the input.

Example operations of the example EDNN environment 100 will now be described. As shown in FIG. 2, an input 105 is provided to the modifier 150. The modifier 150 generates two different overlapping versions of the input 105. In some implementations, the input 105 can be an image I. The modifier 150 generates two versions of the image, e.g., two different crops $I_1$, $I_2$ of the same image I. In some implementations, the crops can have a different number of pixels, be different portions, or have different sizes of the image I. For example, the first image $I_1$ can be the first ¾ of the image I (e.g., the leftmost ¾) and the second image $I_2$ can be the second ¾ of the image I (e.g., the rightmost ¾). In this example, the middle half of the image I is overlapping between the first image $I_1$ and the second image I2. In some implementations, that overlapping portion in between the first input (e.g., image $I_1$) and the second input (e.g., image $I_2$) allows for comparison between the latent space 230 and the latent space 330 (e.g., re-constructed sets of attributes or skeleton poses A, B from the EDNN 200 and the EDNN 300). Further, in various implementations, respectively loading different parts of the input 105 into the EDNN 200 and the EDNN 300 makes sure that the EDNN 200 and the EDNN 300 are different from each other.

For each input 105, the EDNN 200 uses backpropagation to reduce error when comparing the output 140 $I_1'$ to the input $I_1$. The output 140 is formed when the encoding NN 110 populates the data structure of or encodes the latent space 230 based on the input $I_1$, and then the decoding NN 120 re-generates or decodes the input $I_1'$ from this instance of the latent space 230. This training of the EDNN 200 based on each input 105 is represented by the arrow C1 shown in FIG. 2. In one implementation, training the EDNN 200 means reducing or minimizing the difference between the actual output $I_1'$ and the actual input $I_1$.

Similar training of the EDNN 300 based on each input 105 is represented by the arrow C2 shown in FIG. 2.

In some implementations, the latent space of the EDNN 200 is trained to encode a set of actual attributes of the first version of the input 105, and the latent space of the EDNN 300 is trained encode the differences of a set of differences from predefined values (e.g., attribute averages) of the second version of the input 105.

As shown in the example environment 100 of FIG. 2, the latent space 330 is input into a first NN 160. In some implementations, the first NN 160 encodes a non-linear transformation. For example, for human pose annotation, the latent space 330 can identify differences for pose segments identified in the second version of the pose in input 105 from corresponding averages (e.g., population averages for each segment) for segments in the entire skeleton pose. In various implementations, the first NN 160 transforms the differences encoded in the latent space 330 for the second version of the input 105 into a coordinate space of the averages defined for the data structure for the environment 100. In some implementations, the first NN is trained at the same time as the EDNN 200 and the EDNN 300 (e.g., for each input 105, for groups of inputs, etc.).

In various implementations, the transformed differences from the first NN 160 are combined with the attribute averages determined for the data structure in block 170. In some implementations, the transformed differences from the latent space 330 are added to attribute averages determined for the data structure in block 170 to generate a second estimation of the object contained in the input 105. For example, for human pose annotation, the second estimation of the skeleton pose from block 170 should be similar or nearly identical to the first estimation of the skeleton pose in the input 105 encoded by the latent space 230.

As shown in FIG. 2, the second estimation of the object in the input 105 from block 170 is provided to a second NN 180 for a transformation so that the second estimation of the object in the input 105 can be compared to the first estimation of the object in the latent space 230. In some implementations, the second NN 180 reverses or un-does the transformation of the first NN 160. After transformation by the second NN 180, for human pose annotation, the second estimation of the skeleton pose in the input $I_1$ (e.g., shown as the letter A output by the second NN 180) can be compared to the first estimation of the skeleton pose in the input $I_1$ represented by the latent space 230.

For each input 105, the first NN 160 and the second NN 180 each use backpropagation during training to reduce or minimize the error therebetween when comparing the second estimation of the object in the input 105 output by the second NN 180 to the first estimation of the object from the latent space 230. This conventional training of the first NN 160 and the second NN 180 based on each input 105 is represented by the arrow C3 shown in FIG. 2. In one implementation, training the first NN 160 and the second NN 180 occurs at the same time as the training of the EDNN 200 and the EDNN 300 (e.g., each input 105).

In various implementations, the second set of attributes of the object depicted in the input is determined based on the transformed differences combined with (e.g., added to) the attribute averages, for subsequent comparison to the first set of attributes.

Figure 3:
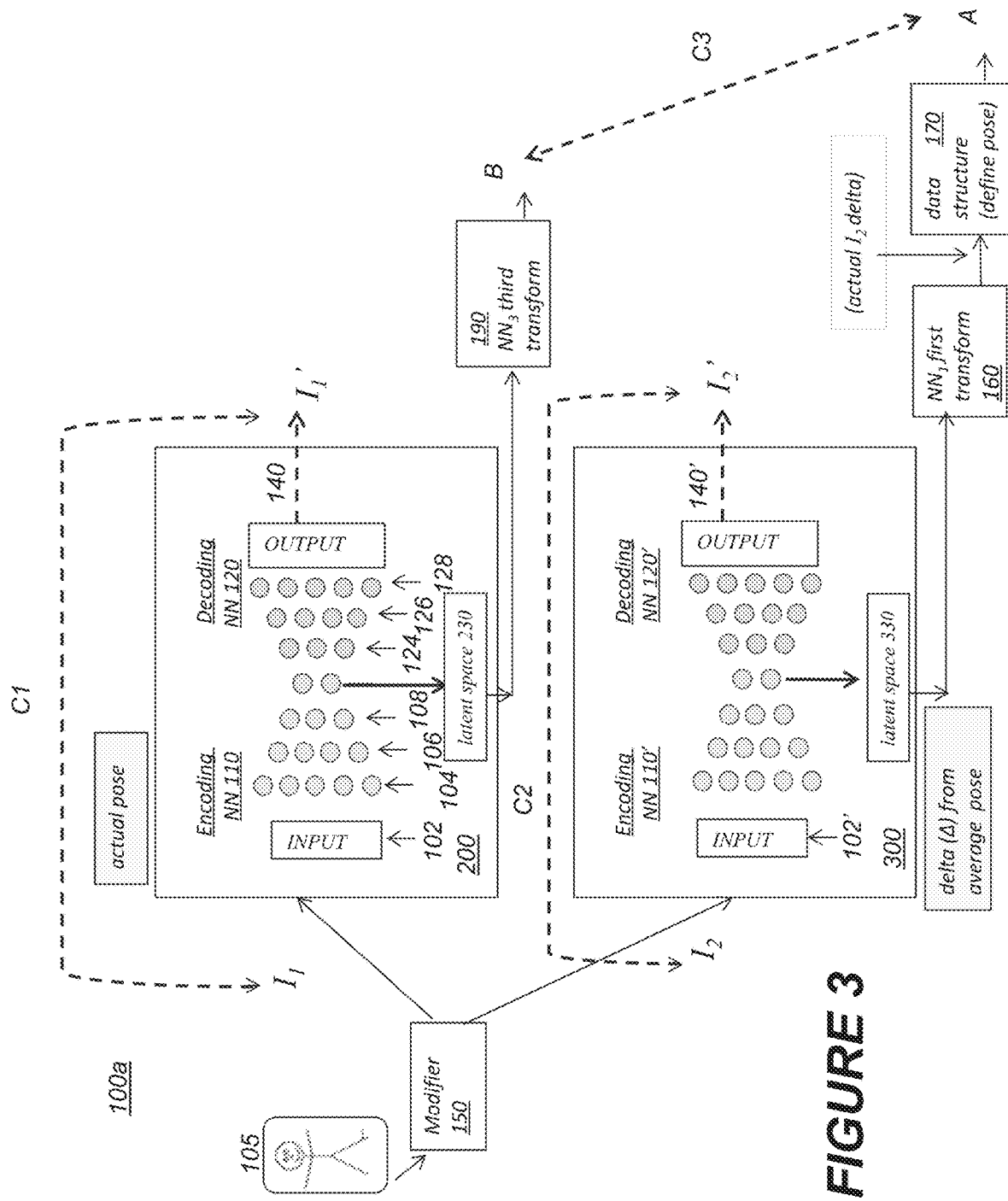
FIG. 3 is a block diagram of another example dual encoder-decoder neural network environment in accordance with some implementations.

FIG. 3 is a block diagram of another example EDNN environment in accordance with some implementations. As shown in FIG. 3, dual EDNN 200 operates in parallel with EDNN 300 in an example EDNN environment 100a (e.g., as described in FIG. 2). Again, the EDNN 200 generates output 140 to be similar or identical to the input $I_1$ while encoding latent space 230. The EDNN 300 generates the output 140' to be similar or identical to the input $I_2$ while encoding latent space 330. In FIG. 3, a defined data structure is used for a latent space for both the EDNN 200 and the EDNN 300. The data structure defines attributes (e.g., wrist-to-elbow distance) corresponding to defined parts (e.g., right arm) of a task (e.g., human pose annotation). During training, related instances (e.g., overlapping crops) of each single training input are respectively provided to the EDNN 200 and the EDNN 300. The EDNN 200 has the latent space 230 encoded with attributes (e.g., set by a predetermined data structure) for an actual object implementation in the input. The EDNN 300 has the latent space 330 encoded with differences from attribute averages for the actual object in the input.

In various implementations, the second estimation of the attributes (e.g., pose) in the input 105 generated from EDNN 300 can be compared to the first estimation of the attributes in the input 105 generated from EDNN 200 to reduce or minimize the error therebetween to train the environment 100a.

As shown in FIG. 3, the second estimation of the attributes in the input 105 from block 170 is determined as described with respect to FIG. 2. As shown in FIG. 3, a third NN 190 transforms the first estimation of the attributes encoded in the latent space 230 for the first version $I_1$ of the input 105 into the coordinate space of the averages defined for the data structure for the environment 100a. After transformation by the third NN 190, the second estimation of the attributes (e.g., skeleton pose) in the input 105 from the block 170 can be compared to the transformed first estimation of the attributes output by the third NN 190. In one implementation, the first NN 160 is the same as the third NN 190. In some implementations, the first NN 160, the third NN 190, the EDNN 200, and the EDNN 300 are trained at the same time using the input 105.

In various implementations, a plurality of different inputs are sequentially provided to the environment 100 for training the first NN 160, the second NN 180, the EDNN 200, and the EDNN 300. Similarly, in various implementations, a plurality of different inputs are sequentially provided to the environment 100a for training the first NN 160, the third NN 190, the EDNN 200, and the EDNN 300.

Figure 4:
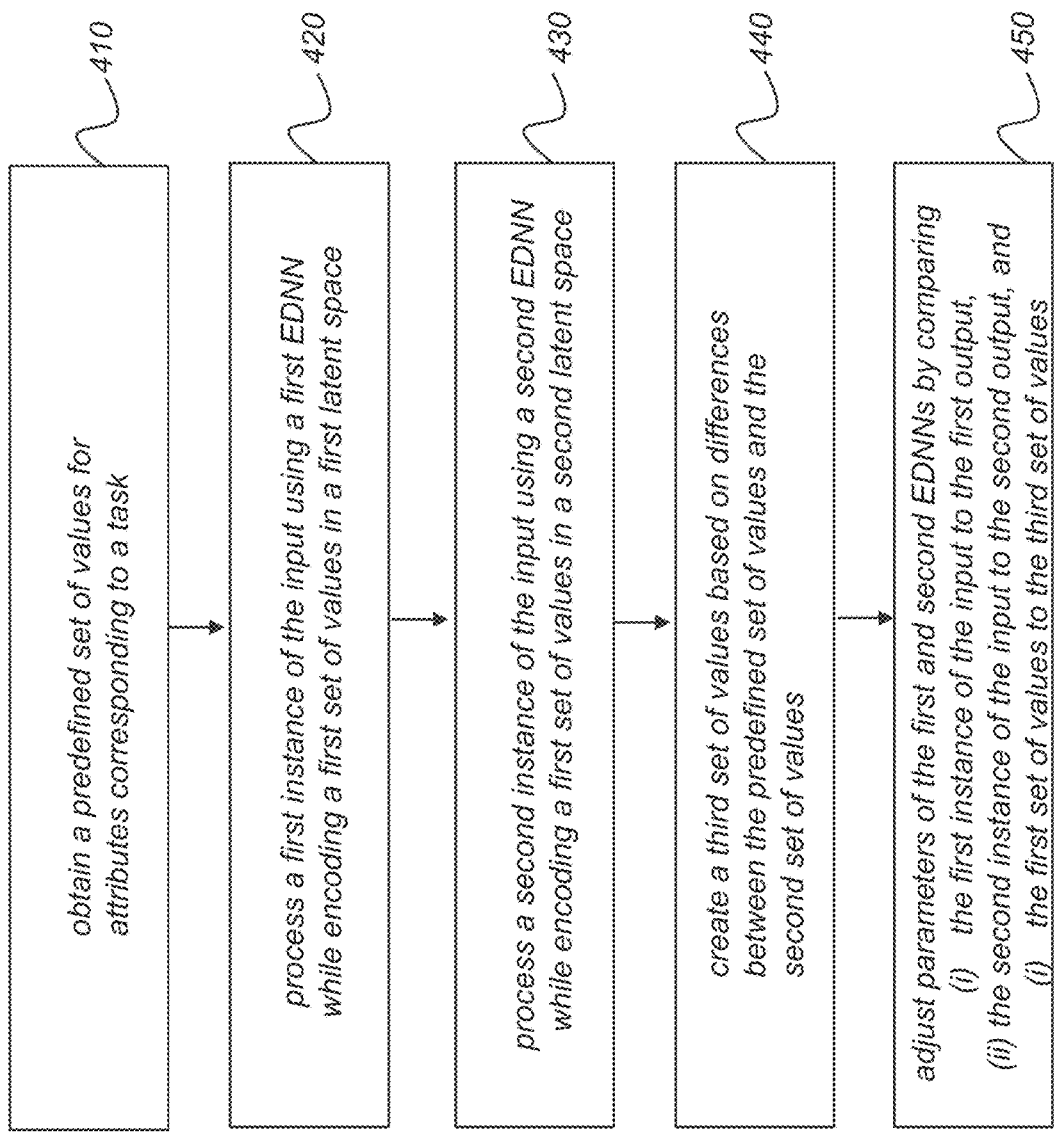
FIG. 4 is a flowchart representation of a method of training at least a first encoder neural network of an example dual encoder-decoder neural network environment in accordance with some implementations.
Figure 5:
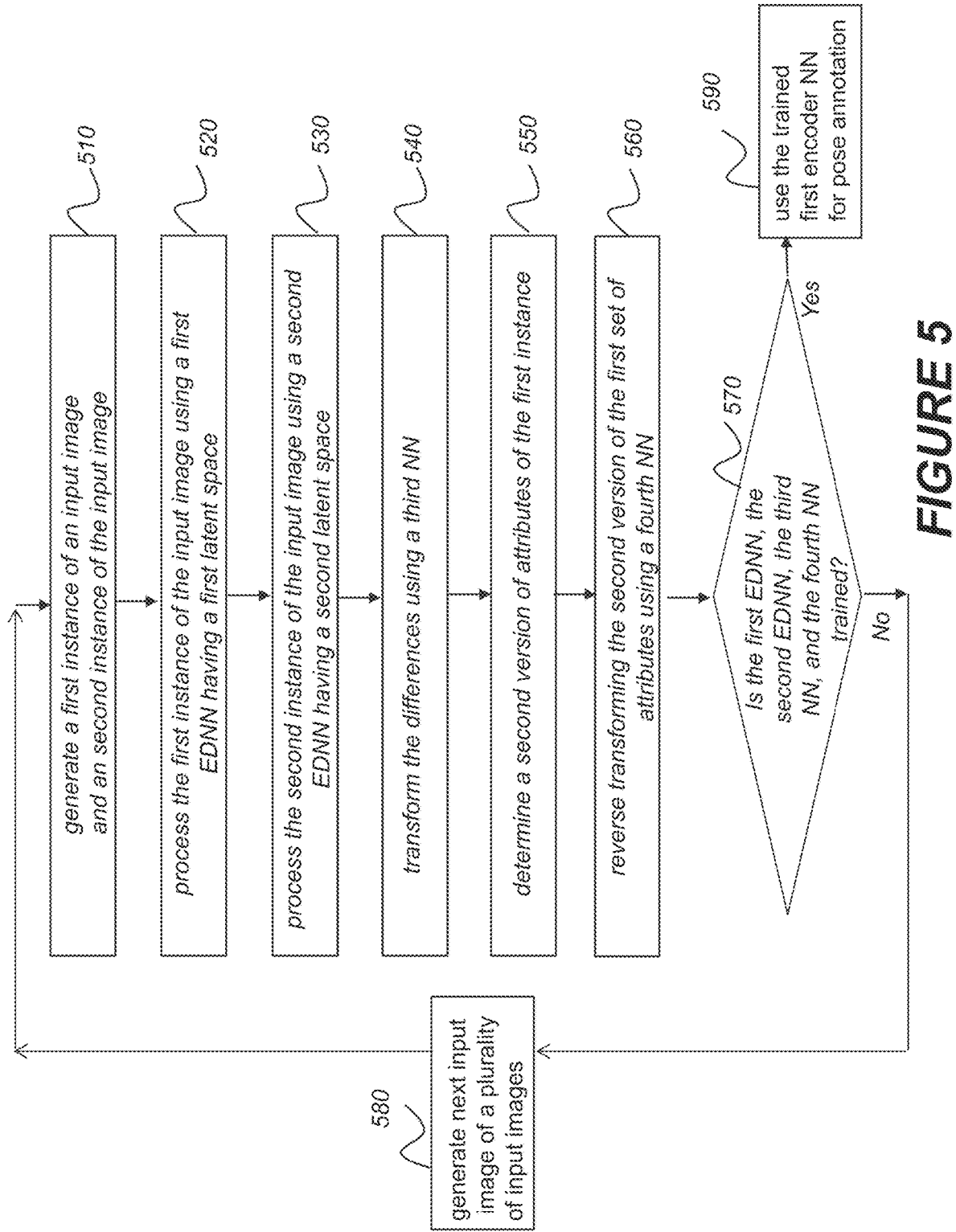
FIG. 5 is a flowchart representation of a method of training at least a first encoder neural network of an example dual encoder-decoder neural network environment in accordance with some implementations.

FIGS. 4-5 are flowchart representations of a method of operating an electronic device in accordance with some implementations. In various implementations, example methods 400, 500 are performed by processing logic, including hardware, firmware, software, or a combination thereof. In some implementations, example methods 400, 500 are performed by a processor executing code stored in a non-transitory computer-readable medium (e.g., a memory). In some implementations, example methods 400, 500 are performed on a portable electronic device (e.g., laptop, tablet, smartphone, head-mounted display (HMD).

At block 410, the method 400 obtains a predefined set of values for attributes corresponding to a task. In some implementations, a number of values in the predefined set of values for the attributes is equal to a number of the attributes corresponding to the task. In the example task of human pose annotation, the predefined set of values for attributes (e.g., skeleton segment sizes) corresponds to a complete input human pose to be annotated.

At block 420, the method 400 processes a first instance of an input using a first EDNN to produce a first output while encoding a first set of values in a first latent space. In various implementations, at block 420 the first EDNN 200 produces a first output 140 to match a first input $I_1$ while encoding the latent space 230 with the first set of values using the input $I_1$. In the human pose annotation example, the EDNN 200 produces output 140 (e.g., $I_1'$) to match the input 102 (e.g., $I_1$) while encoding actual sizes of an input pose 102 (e.g., forearm length in the input image $I_1$).

At block 430, the method 400 processes a second instance of the input using a second EDNN to produce a second output while encoding a second set of values in a second latent space. In various implementations, at block 430 the second EDNN 300 produces an output 140' (e.g., $I_2'$) to match the input 102' (e.g., $I_2$) while encoding the latent space 330 with the second set of values (e.g., representative values) using the input $I_2$. In the human pose annotation example, the EDNN 300 produces the output $I_2'$ to match the input $I_2$ while encoding representative values of an input human pose in the input $I_2$ (e.g., related to statistical values for groups of inputs). In some implementations, a number of values in the predefined set of values for attributes is equal to a number of values in the first set of values and the second set of values.

At block 440, the method 400 creates a third set of values based on differences between the predefined set of values for the attributes and the second set of values. In various implementations, at block 440 the second set of values are transformed (e.g., scale, rotate, etc. using a non-linear NN 160) into the coordinate space of the predefined set of values for the attributes. In the human pose annotation example, at block 440, reconstructed actual pose attributes are generated from combining the transformed second set of values (based on the latent space 330) with the predefined set of values for the attributes.

At block 450, the method 400 adjusts parameters of the first and second EDNNs based on comparing the first instance of the input to the first output, the second instance of the input to the second output, and the first set of values to the third set of values (e.g., matching the inputs and outputs of each EDNN and matching the actual and reconstructed attributes). In some implementations, at block 450 there are three (3) losses to minimize in order to train the environment 100, 100a: (i) input image $I_1$ compared to the image $I_1'$ output by the EDNN 200, (ii) input image $I_2$ compared to the image $I_2'$ output by the EDNN 300, (iii) the third set of values (e.g., A) compared to the first set of values (e.g., B). In some implementations, only the values from the overlapping portion of the first and second instance of the input are compared in block 450. In some implementations, blocks 420-450 can be repeated for a plurality of sequential inputs.

As described for FIG. 4, when the first EDNN 200, the second EDNN 300 are sufficiently adjusted, the first encoder 110 of the first EDNN 200 can be integrated into an application for use with live or real world inputs. For example, such an application can be stored on a device and executed by a user to perform the task on a new input, e.g., the user may execute the application, provide a new image, and the application may implement the neural network to provide annotation for the image. In another example, the application is stored on a server or other remote device and is accessed by a user to perform a task.

FIG. 5 is a flowchart representation of a method of training at least a first encoder NN of an example dual EDNN environment in accordance with some implementations. In FIG. 5, the dual EDNN environment is used for human pose annotation for an input image.

At block 510, the method 500 receives an input image and generates a first instance of the input image and a second instance of the input image. In various implementations, the generated first instance of the input image and the generated second instance of the input image overlap. In block 510, for example, the first instance of the input image and the second instance of the input image can be different overlapping crops of the input image.

At block 520, the method 500 processes the first instance of the input image using a first EDNN (e.g., EDNN 200) having a first latent space defined to encode a first set of human pose attributes that are represented in the first instance of the input image. For human pose annotation, the first set of attributes can be pose attributes of a human (e.g., the actual pose) depicted the first instance of the input image such as distance from wrist to elbow, etc.

At block 530, the method 500 processes the second instance of the input image using a second EDNN having a second latent space defined to encode differences (e.g., deltas) between a second set of attributes and pre-determined attribute averages of the set of attributes. In various implementations, the first set of attributes and the second set of attributes correspond to a pre-defined human pose attribute data structure. For human pose annotation, the second set of attributes can be pose differences from the attribute average values of a human depicted in the second instance of the input image (e.g., how much the distance from wrist to elbow differs from the average distance of wrist to elbow, etc.).

At block 540, the method 500 transforms the differences using a third NN. In various implementations, the third NN is trained to transform the differences encoded in the second latent space (e.g., latent space 330) to the same coordinate space or 3D space of the first set of attributes or attribute averages. Thus, the third NN transforms the second set of attributes to the same space (e.g., for later comparison with the first set of attributes). In some implementations, the third NN transformation can account for how the input image was captured relative to how the data structure (e.g., pose and averages) were defined. In some implementations, the third NN transformation can include (e.g., scale, rotate, etc. to account for spatial differences (e.g., smaller attribute values for human pose lengths (distance wrist to elbow, etc.) in images taken from farther away).

At block 550, the method 500 determines a second version of the first instance of the human pose depicted in the input image based on the transformed differences from block 540 and the pre-determined averages of each of the human pose attributes. In various implementations, the transformed differences are added to the pre-determined averages to get a second version of the actual human pose in the first set of attributes. In block 550, the transformed differences of the second set of attributes (e.g., how much the distance from wrist to elbow differs from the average wrist to elbow distance) is added to the average wrist to elbow distance to form the second version of the forearm in the first instance of the input image.

At block 560, the method 500 transforms the second version of the actual first set of attributes using a fourth NN. In various implementations, the fourth NN transforms the second version of the actual human pose in the first instance of the input image back to the coordinate space of the input image. Thus, the fourth NN undoes the third transformation by undoing the scale, rotate, etc.

At block 570, the method 500 determines whether the first EDNN, the second EDNN, the third NN, and the fourth NN are sufficiently trained. At block 570, the method 500 has three (3) losses to reduce or minimize in order to train the environment 100, 100a: (i) input image $I_1$ compared to the image $I_1'$ output by the EDNN 200, (ii) input image $I_2$ compared to the image $I_2'$ output by the EDNN 300, (iii) the transformed structure output (e.g., A) compared to the latent space of the first EDNN 200 (e.g., B). In some implementations, only the overlapping portion of the first and second instance of the input image are compared in block 570 (e.g., transformed forearm for comparison to the forearm of the first set of attributes).

When the determination in block 570 is affirmative, control passes from training in the method 500 to using the first encoder (e.g., first encoder 110) of the first EDNN in the method 500. At block 590, the first encoder of the first EDNN is ready to be used to identify and annotate human poses in subsequently received images. At block 590, the method 500 uses the first encoder of the first EDNN for its intended purpose on live or real world data. In some implementations, the method 500 uses the first encoder of the first EDNN for prediction, forecasting, classification, pattern recognition, or the like at block 590. When the determination in block 570 is negative, control continues to block 580.

At block 580, the method 500 select one of a plurality of additional input images for human pose annotation training and control returns to block 510 (e.g., blocks 510-570 are repeated).

In various implementations, a NN is used to perform selected tasks. In some implementations, operations of some NN implementations include prediction, forecasting, classification, pattern recognition or general reinforcement learning. In some implementations, NN implementations include feed-forward or feedback implementations. In some implementations, NNs include a multi-stage NN. In some implementations, types of NNs include Radial basis function NNs, Kohonen Self Organizing NNs, Recurrent NNs, Convolutional NNs, Modular NNs and the like.

In various implementations, input data to NNs can include images of high or low resolution. In some implementations, NNs can be configured to use event camera data, shutter-based camera data, or a combination of the two types of data. In some implementations, input data is numerical or converted to numerical data. For example, sound is converted to numbers that represent amplitude over time where 0 is silence and 1 is loud. For example, images are converted to greyscale measured on a scale from 0 is black and 1 is white. For example, male/female can be converted to 0/1.

Figure 6:
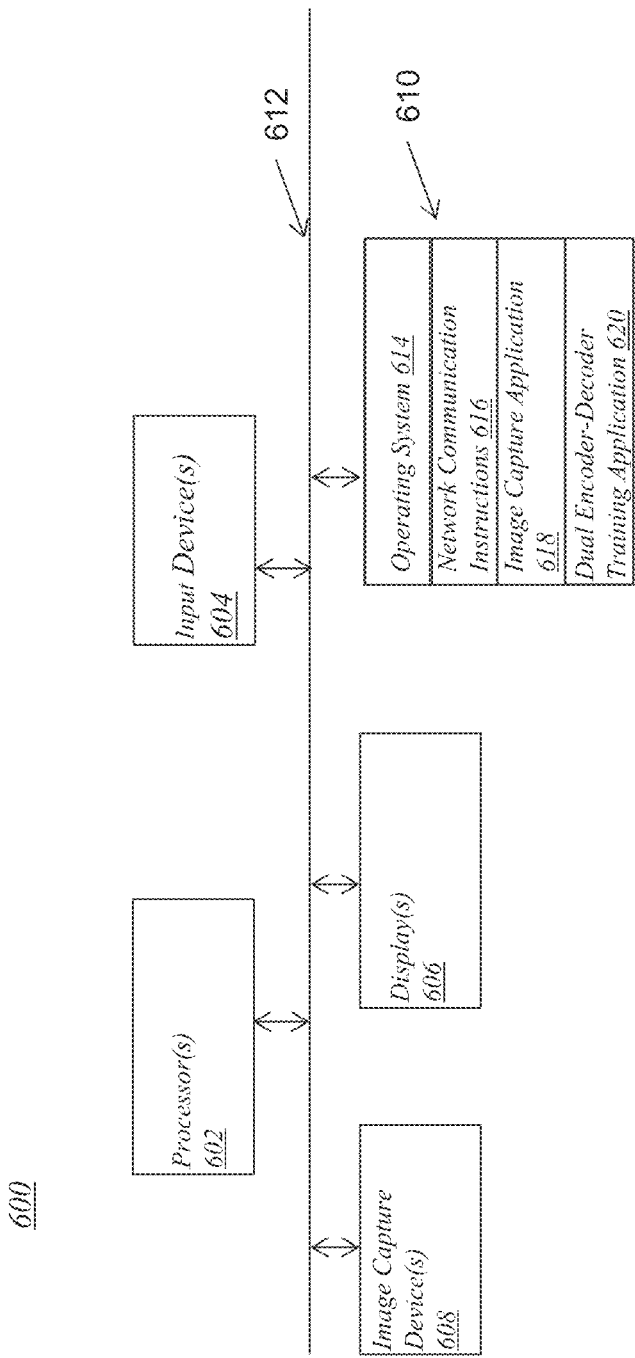
FIG. 6 is a block diagram of an example system architecture implementing dual encoder-decoder neural network training and use applications.

FIG. 6 is a block diagram of an example system architecture implementing the EDNN training applications according to FIGS. 2-5. The architecture 600 can be implemented on any electronic device that runs software applications derived from compiled instructions, including without limitation personal computers, servers, smart phones, media players, electronic tablets, game consoles, digital cameras, video cameras, email devices, etc. In some implementations, the architecture 600 can include one or more processors 602, one or more input devices 604, one or more display devices 606, image capture device 608, and one or more computer-readable mediums 610. Each of these components can be coupled by bus 612.

Display device 606 can be any known display technology, including but not limited to display devices using Liquid Crystal Display (LCD) or Light Emitting Diode (LED) technology. Processor(s) 602 can use any known processor technology, including but not limited to graphics processors and multi-core processors. Input device 604 can be any known input device technology, including but not limited to a keyboard (including a virtual keyboard), mouse, track ball, and touch-sensitive pad or display. Bus 612 can be any known internal or external bus technology, including but not limited to ISA, EISA, PCI, PCI Express, NuBus, USB, Serial ATA or FireWire. Computer-readable medium 610 can be any medium that participates in providing instructions to processor(s) 602 for execution, including without limitation, non-volatile storage media (e.g., optical disks, magnetic disks, flash drives, etc.) or volatile media (e.g., SDRAM, ROM, etc.).

Computer-readable medium 610 can include various instructions 614 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 604; sending output to display device 606; keeping track of files and directories on computer-readable medium 610; controlling peripheral devices (e.g., disk drives, printers, etc.) which can be controlled directly or through an I/O controller; and managing traffic on bus 612. Network communications instructions 616 can establish and maintain network connections (e.g., software for implementing communication protocols, such as TCP/IP, HTTP, Ethernet, etc.).

An image capture application 618 can include instructions that operate the image capture device 608. The image capture device 608 can be an embedded device or a separate device coupled to system architecture 600 through a port (e.g., USB, FireWire).

Dual Encoder-Decoder training application 620 can be an application that implements the training and later use of EDNNs and processes described in reference to FIGS. 2-5. The Dual Encoder-Decoder training application 620 can also be implemented as part of operating system 614.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

Moreover, FIG. 6 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method, comprising:
   at an electronic device with one or more processors,
   obtaining a predefined set of values for attributes corresponding to a task;
   processing a first instance of an input using a first encoder-decoder neural network to produce a first output while encoding a first set of values in a first latent space;
   processing a second instance of the input using a second encoder-decoder neural network to produce a second output while encoding a second set of values in a second latent space;
   creating a third set of values based on differences between the predefined set of values for the attributes and the second set of values; and
   adjusting parameters of the first and second encoder-decoder neural networks based on comparing the first instance of the input to the first output, the second instance of the input to the second output, and the first set of values to the third set of values.

2. The method of claim 1, further comprising integrating the adjusted first encoder neural network into an application.

3. The method of claim 1, wherein creating the third set of values comprises transforming the second set of values into a 3D space associated with the predefined set of values for the attributes.

4. The method of claim 1, wherein creating the third set of values comprises transforming the differences using a third neural network.

5. The method of claim 1, wherein creating the third set of values comprises identifying initial values for the third set of values by adding the second set of values to the predefined set of values for the attributes.

6. The method of claim 5, wherein creating the third set of values comprises transforming the initial values for the third set of values using a fourth neural network.

7. The method of claim 5, wherein creating the third set of values comprises transforming the initial values for the third set of values into a 3D space associated with the input.

8. The method of claim 5, further comprising transforming the first set of values using a fourth neural network.

9. The method of claim 5, further comprising transforming the first set of values into a 3D space associated with the predefined set of values for the attributes.

10. The method of claim 1, wherein the predefined set of values for the attributes comprises average values for the attributes.

11. The method of claim 1, wherein the first instance and the second instance are the same.

12. The method of claim 1, wherein the first instance and the second instance are partially overlapping cropped portions of the input.

13. The method of claim 1, wherein adjusting the parameters comprises training by minimizing error in the comparing using gradient decent backpropagation.

14. The method of claim 1, wherein the task is human pose estimation, hand or body tracking, pattern recognition, or classification.

15. The method of claim 1, wherein the input comprises numeric representations of image, audio, video, or a data set.

16. The method of claim 1, further comprising:
   processing a first instance of an additional input using the first encoder-decoder neural network to produce an additional first output while encoding an additional first set values in the first latent space;
   processing a second instance of the additional input using the second encoder-decoder neural network to produce an additional second output while encoding an additional second set of values in the second latent space;
   creating an additional third set of values based on differences between the predefined set of values for the attributes and the additional second set of values; and
   re-adjusting parameters of the first and second encoder-decoder neural networks based on comparing the first instance of the additional input to the additional first output, the second instance of the additional input to the additional second output, and the additional first set of values to the additional third set of values.

17. The method of claim 1, wherein a number of values in the predefined set of values for attributes is equal to a number of values in the first set of values and the second set of values.

18. The method of claim 1, wherein a number of values in the predefined set of values for the attributes is equal to a number of the attributes corresponding to the task.

19. A system comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the system to perform operations comprising:

obtaining a predefined set of values for attributes corresponding to a task;

processing a first instance of an input using a first encoder-decoder neural network to produce a first output while encoding a first set of values in a first latent space;

processing a second instance of the input using a second encoder-decoder neural network to produce a second output while encoding a second set of values in a second latent space;

creating a third set of values based on differences between the predefined set of values for the attributes and the second set of values; and adjusting parameters of the first and second encoder-decoder neural networks based on comparing the first instance of the input to the first output, the second instance of the input to the second output, and the first set of values to the third set of values.

20. A non-transitory computer-readable storage medium, storing program instructions computer-executable on a computer to perform operations comprising:

obtaining a predefined set of values for attributes corresponding to a task;

processing a first instance of an input using a first encoder-decoder neural network to produce a first output while encoding a first set of values in a first latent space;

processing a second instance of the input using a second encoder-decoder neural network to produce a second output while encoding a second set of values in a second latent space;

creating a third set of values based on differences between the predefined set of values for the attributes and the second set of values; and adjusting parameters of the first and second encoder-decoder neural networks based on comparing the first instance of the input to the first output, the second instance of the input to the second output, and the first set of values to the third set of values.

* * * * *